United States Patent
Cheng et al.

(10) Patent No.: US 12,306,643 B1
(45) Date of Patent: May 20, 2025

(54) METHOD FOR ADAPTIVELY ROLE-SELECTION IN COORDINATED MULTI-ROBOT SEARCH TASK AND SYSTEM THEREOF

(71) Applicant: SHANDONG UNIVERSITY, Jinan (CN)

(72) Inventors: Jiyu Cheng, Jinan (CN); Wei Zhang, Jinan (CN); Lina Zhu, Xi'an (CN); Yuehu Liu, Xi'an (CN); Shuo Yang, Jinan (CN); Ran Song, Jinan (CN); Xiaolei Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 19/014,678

(22) Filed: Jan. 9, 2025

(30) Foreign Application Priority Data

Jan. 12, 2024   (CN) .................. 202410053276.X

(51) Int. Cl.
   *G05D 1/698*   (2024.01)
   *G05D 101/15*  (2024.01)
   (Continued)

(52) U.S. Cl.
   CPC ......... *G05D 1/698* (2024.01); *G05D 2101/15* (2024.01); *G05D 2105/85* (2024.01); *G05D 2105/87* (2024.01)

(58) Field of Classification Search
   CPC .............. G05D 1/698; G05D 2101/15; G05D 2105/87; G05D 2105/85
   See application file for complete search history.

(56) References Cited

U.S. PATENT DOCUMENTS

| | | | |
|---|---|---|---|
| 2024/0160229 A1* | 5/2024 | Rana | G05D 1/693 |
| 2024/0312215 A1* | 9/2024 | Purswani | G08G 5/55 |
| 2025/0013251 A1* | 1/2025 | Nise | G05D 1/6983 |

FOREIGN PATENT DOCUMENTS

| | | |
|---|---|---|
| CN | 115809751 A | 3/2023 |
| CN | 115982610 A | 4/2023 |
| KR | 20180083084 A | 7/2018 |

OTHER PUBLICATIONS

Dai, Wei. "Dynamic Task Allocation and Shared Control for Multi-robot System" China Doctoral Dissertation Full Text Database Information Technology Series, No. 2, Feb. 15, 2023.
(Continued)

*Primary Examiner* — Matthew J. Reda
(74) *Attorney, Agent, or Firm* — IPRO, PLLC

(57) ABSTRACT

The present invention discloses a method for adaptively role-selection in coordinated multi-robot search task and system thereof, comprising: defining a role action space as two discrete values: [explore, cover]; acquiring and inputting local perception information $o_t^i$ and joint perception information $jo_t^i$ into a role policy, and outputting a role action $\rho_t^i$; wherein, the local perception information comprises an obstacle map, an explored map, a covered map, and a position map; and, the joint perception information comprises a merged explored map and a merged covered map; inputting the local perception information $o_t^i$ and the output role action $\rho_t^i$ into a primitive policy, and outputting a primitive action $a_t$ of robot to interact with the environment; then, a robot is controlled to execute corresponding output primitive action $a_t$ according to received specific role action $\rho_t^i$.

5 Claims, 3 Drawing Sheets

(51) Int. Cl.
*G05D 105/80* (2024.01)
*G05D 105/85* (2024.01)

(56) References Cited

OTHER PUBLICATIONS

Ricardo Dias et al. "Multi-Robot Fast-Paced Coordination with Leader Election" Robot World Cup XXII, vol. 11374, Aug. 4, 2019.

* cited by examiner

METHOD FOR ADAPTIVELY ROLE-SELECTION IN COORDINATED MULTI-ROBOT SEARCH TASK AND SYSTEM THEREOF

CROSS-REFERENCE TO RELATED APPLICATIONS

The present invention claims priority benefits to Chinese Patent Application number 202410053276.X, entitled "A Method for Adaptively Role-selection in Coordinated Multi-robot Search Task and System Thereof", filed on Jan. 12, 2024, with the China National Intellectual Property Administration (CNIPA), the entire contents of which are incorporated herein by reference and form a part thereof for all purposes.

TECHNICAL FIELD

The present invention relates to the technical field of coordinated multi-robot sequential decision-making, in particular to a method for adaptively role-selection in coordinated multi-robot search task and system thereof.

BACKGROUND

The statements in this section merely provide background information related to the present invention and do not necessarily constitute prior art.

Coordinated multi-robot area search is a fundamental research problem in robotics field due to its wide range of applications, such as Mars exploration, disaster response, or urban search and rescue, etc. Different from single-robot system, multi-robot system has more advantages in time-critical tasks because it can achieve cooperative decision-making among multi-robots to improve task completion efficiency and maintain flexible decision-making.

In the decision-making process of coordinated multi-robot area search task, the robots are entailing performing collaborative mapping (exploration) while simultaneously search for the targets (coverage). Wherein, the robot needs to: 1) sense the environment to gather more information about the targets; 2) rescue the targets; and, 3) cooperate with other robots to rescue more targets in the explored area in a short time.

The most efficient way to handle complex tasks is to break them down into smaller and simpler subtasks. As a result, many previous studies have focused on breaking down the area search task into two distinct subtasks: exploration and coverage, which are accomplished in two distinct phases. In the decomposition method, the robot first selects a sub-area generated by a cellular decomposition algorithm such as Voronoi partition algorithm, and then scans the entire sub-area along a planned path calculated by a coverage planning algorithm to complete the coverage task. However, completely separating exploration and coverage tasks will lead to suboptimal solutions and increased computational costs, thus limiting the overall task completion efficiency. Therefore, a unified method for handling the exploration and coverage subtasks simultaneously is expected to be developed to maximize resource utilization, improve efficiency and obtain optimal solutions.

There is currently a unified method to modeling simultaneous coverage and exploration tasks as combinatorial optimization problems. The approach discretizes the exploration and coverage problem into a graph-structured environment, and achieves simultaneous execution of the exploration and coverage subtasks by learning the spatial relationship between all subtasks and robots on the graph structure. A completely unified approach can dynamically improve the decision-making capabilities of robots, but the coupling of task planning and task execution often escalates training complexity. In order to reduce the training complexity and achieve explicit cooperation between robots, decoupling task planning and task execution from an upper-level perspective is an effective solution, and decoupling is needed for a deeper understanding of complex tasks. Some researchers have begun to decouple the simultaneous coverage and exploration tasks, yet the method for calculating information gain and allocating subtasks to each robot is hand-crafted and heuristic, and it has been proven to be an NP-hard problem as the environment scale increases.

SUMMARY

In order to solve above-mentioned problems, the present invention provides a method for adaptively role-selection in coordinated multi-robot search task and system thereof, wherein the present method constructs a role selection module to decouple task planning from an upper-level perspective, trains a distributed role policy based on deep reinforcement learning (DRL) to complete role selection, guides a robot to select between the exploration and coverage subtasks, and further trains a primitive policy based on an Actor-Critic architecture framework, when the robot is guided to execute corresponding subtasks based on roles.

In some embodiments, the following technical solutions are adopted.

A method for adaptively role-selection in coordinated multi-robot search task, comprising:

defining a role action space as two discrete values: [explore, cover];

acquiring and inputting local perception information $o_t^i$ and joint perception information $jo_t^i$ into a role policy, and outputting a role action $\rho_t^i$; wherein, the local perception information comprises an obstacle map, an explored map, a covered map, and a position map; and, the joint perception information comprises a merged explored map and a merged covered map; and inputting the local perception information $o_t^i$ and the output role action $\rho_t^i$ into a primitive policy, and outputting a primitive action $a_t$ of robot to interact with the environment; wherein, when the output role action $\rho_t^i$ received by a robot is an explore role action, the robot moves towards a frontier cell closest to the robot in a field of view (FOV); and, when the output role action $\rho_t^i$ received by the robot is a cover role action, the robot moves towards a target cell closest to the robot in the FOV.

In other embodiments, the following technical solutions are adopted.

A system for adaptively role-selection in coordinated multi-robot search task, comprising:

an action space module, configured to define a role action space as two discrete values: [explore, cover];

a role selection module, configured to acquire and input local perception information $o_t^i$ and joint perception information $jo_t^i$ into a role policy, and to output a role action $\rho_t^i$; wherein, the local perception information comprises an obstacle map, an explored map, a covered map, and a position map; and, the joint perception information comprises a merged explored map and a merged covered map; and a primitive action output module, configured to input the local perception information $o_t^i$ and the output role action $\rho_t^i$ into a primitive policy, and output a primitive action $a_t$ of robot to interact with the environment; wherein, when the output role action $\rho_t^i$ received by a robot is an explore role action, the robot moves towards a frontier cell closest to the robot in a FOV; and, when the output role action $\rho_t^i$ received by the robot is a cover role action, the robot moves towards a target cell closest to the robot in the FOV.

In other embodiments, the following technical solutions are adopted.

A terminal device, comprising a processor and a memory, wherein the processor is used for implementing instructions, and the memory is used for storing a plurality of the instructions; wherein when the instructions are loaded by the processor, executing a method for adaptively role-selection in coordinated multi-robot search task.

Compared with the prior art, the invention has the advantages that:

(1) According to present invention, proposing a unified method to complete collaborative mapping to perceive more areas (exploration) while searching and locating targets (coverage), avoiding the suboptimal solution and high complexity calculation cost faced when completing subtasks independently. The implementation of hierarchical reinforcement learning algorithm decouples task planning from task execution, which greatly reduces the complexity of algorithm training. First, the concept of "role" is embedded into the task planning layer to complete role selection, which allows the robot to learn its own role based on the environmental state from the perspective of the upper layer. In addition, the role switching mechanism ensures the role switching between two time steps, so that the two subtasks of exploration and coverage promote each other. Secondly, the task execution is accomplished by the primitive policy, which makes the robot learn how to plan under the condition of the role actions output by the upper role policy and local observation information.

(2) According to the present invention, providing an autonomous and adaptive role selection method based on reinforcement learning for coordinated multi-robot search, an upper-level task planning thereof is accomplished through a role selection framework comprising a role policy trained by multi-agent reinforcement learning, which can guide the robot to autonomously select the role in the current state to maximize its own expertise. In the process of sequential role planning, intelligent role switching mechanism enables different roles to promote each other to improve performance dynamically. In addition, the task execution of the multi-robot in this method is completed through the primitive policy, which takes the role output by the upper role policy as a condition and makes decisions based on local perception information, so that the ability of the primitive policy represents the exploration or coverage ability.

(3) According to the present invention, introducing a role selection module for task planning, and completing task execution based on the primitive action. The joint observation-based role actions of all robots represent an upper-level understanding of the dynamic area-searching environment. This design facilitates adaptation of the multi-robot system of the present invention to environments of different scales or highly complex environments containing more robots.

Other features and advantages of additional aspects of the present invention will be set forth in part in the following description, and in part will become apparent from the following description, or may be learned by practice of the aspects.

DETAILED DESCRIPTION

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "comprising" used in this specification indicate that there are features, steps, operations, devices, components, and/or combinations thereof.

Example 1

In one or more embodiments, providing a method for adaptively role-selection in coordinated multi-robot search task, decoupling a task planning and a task execution of the complex task. Wherein, the task planning allows a robot to learn roles from an upper-level perspective, and the roles are obtained by calculating through a role policy. Role selection between different time steps is driven by a role switching mechanism. The task execution is achieved by the primitive policy.

Upper-level task planning is accomplished through the role selection framework, which consists of the role policy trained by multi-agent reinforcement learning, which can guide the robot to autonomously select the role in the current state to maximize its own expertise. In the process of sequential role planning, intelligent role switching mechanism enables different roles to promote each other to improve performance dynamically. In addition, in the present example, the task execution of the multi-robot is completed through the primitive policy, and the decision is made based on the local perception information with the role output by the upper role policy as the condition.

Figure 2:
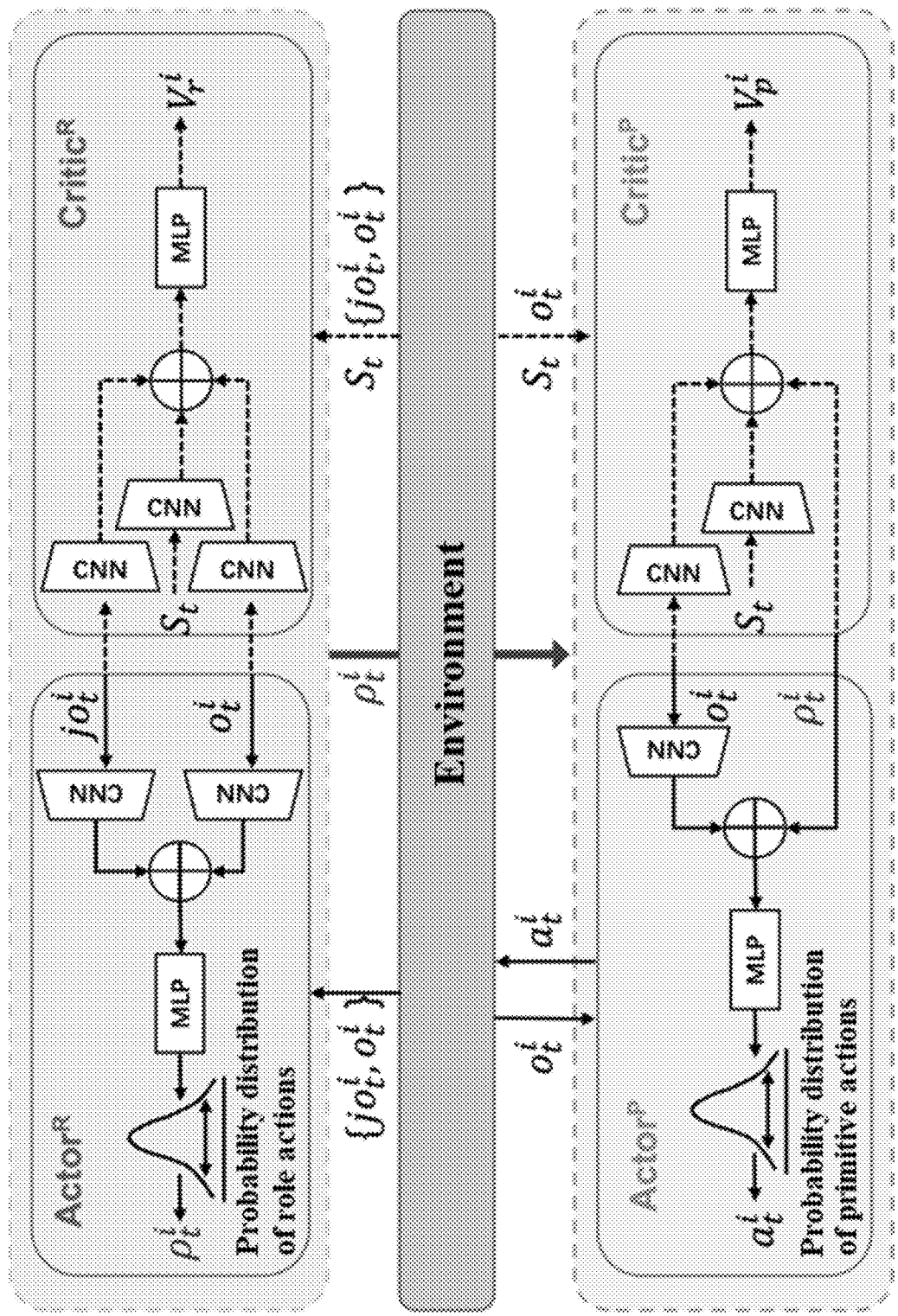
FIG. 2 is a structural diagram of a role policy and a primitive policy in an example of the present invention.
Figure 3:
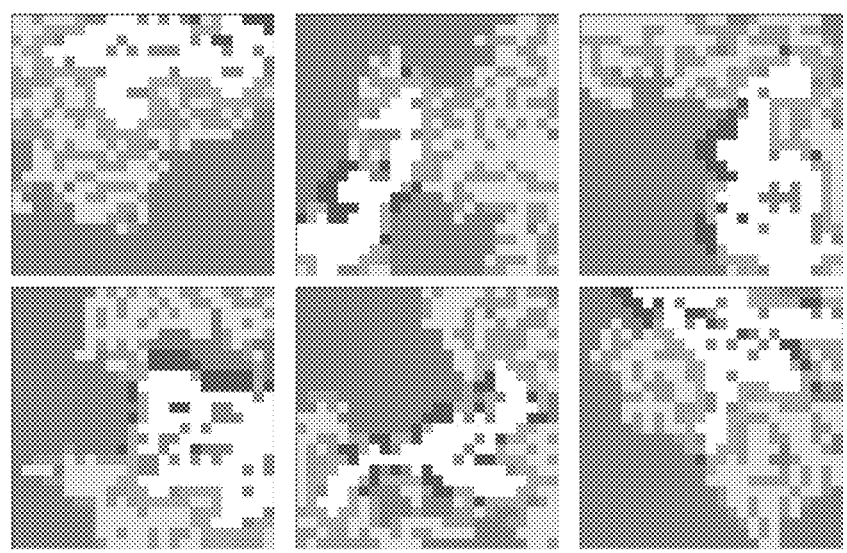
FIG. 3 is an example diagram of a simulation environment in an example of the present invention.

As shown in FIG. 2, the present example introduces a reinforcement learning algorithm of double Actor-Critic, aiming at embedding the concept of "role" in the multi-robot area search task. According to the present invention, a centralized training and distributed execution architecture commonly for coordinated multi-robot tasks is adopted, so that the multi-robot has a distributed policy. The present invention deploys two Actor-Critic networks for training, which are (Actor-Critic)$^R$ and (Actor-Critic)$^P$, wherein, the Actor$^R$ is a network used for role selection, and its output role actions are used as inputs to the Actor$^P$ and Critic$^P$ networks, guiding the Actor$^P$ and Critic$^P$ networks to be trained in an output direction of roles output at the upper-level.

In the training process, the role state value function $V_r$ and the primitive state value function $V_p$ are calculated by the Critic$^R$ network and the Critic$^P$ network, respectively. In the execution process, the primitive actions are sampled from a primitive action probability distribution produced by the primitive policy.

In the execution process, the Critic$^R$ and Critic$^P$ networks may be removed, so that the multi-robot completes mapping calculation of upper role actions based on role policy—the Actor$^R$, and completes mapping calculation of lower interaction actions based on primitive policy —the Actor$^P$. The interactive action distribution and state value function of robot are based on the actions of upper roles, and different roles correspond to different subtasks.

Figure 1:
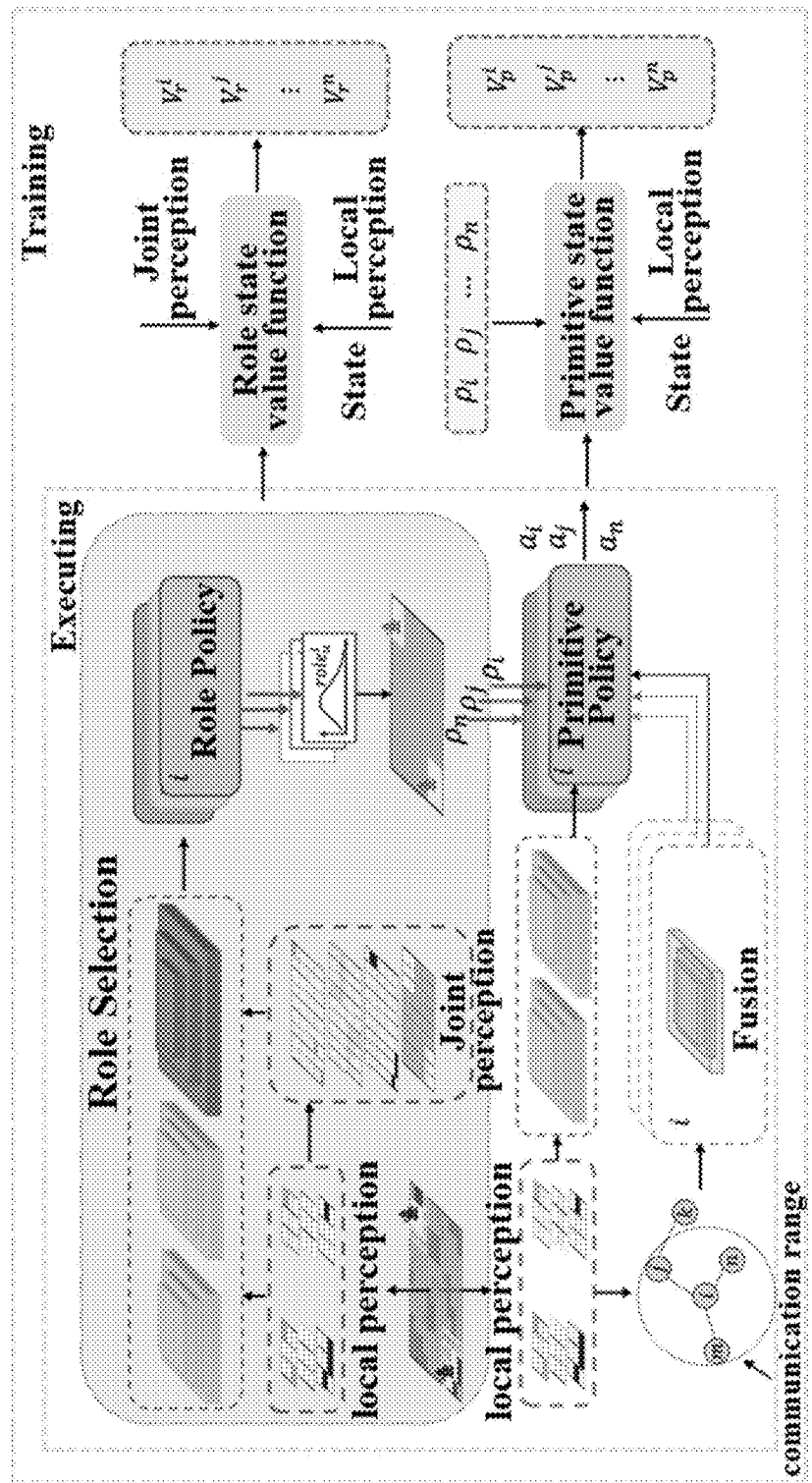
FIG. 1 is a flow chart of a method for adaptively role-selection in coordinated multi-robot search task according to an example of the present invention.

Referring to FIG. 1, the method of the present example specifically comprises the following processes:

(1) Defining a role action space as two discrete values: [explore, cover];

Specifically, in a coordinated multi-robot task, the number of action spaces usually matches the number of subtasks. Therefore, based on attributes of subtasks of the exploration and coverage, the role action space is defined as two discrete values: [explore, cover]. When the robot receives a command of an explore role action, the robot is controlled to move towards the nearest frontier cell in a FOV. Similarly, when the robot receives a command of cover role action, the robot is controlled to move towards the nearest target cell in the FOV.

(2) Acquiring and inputting local perception information $o_t^i$ and joint perception information $jo_t^i$ into a role policy, and outputting a role action $\rho_t^i$; wherein, the local perception information comprises an obstacle map, an explored map, a covered map, and a position map; and, the joint perception information comprises a merged explored map and a merged covered map.

Specifically, the present example introduces a role policy to perform task planning, and completes tasks based on role actions. The joint observation-based role actions of all robots represent an upper-level understanding of the dynamic area-searching environment. This design facilitates the adaptation of the corresponding multi-robot system to environments of different scales or to highly complex environments containing more robots. Multi-agent proximal policy optimization (MAPPO) algorithm is used to train the role policy and the primitive policy. There are centralized critic network and distributed actor network for both the upper role policy and the lower primitive policy. In this architecture, each robot has an independent local policy network and a centralized state value network.

In a search environment containing static obstacles and targets, each robot moves within its own FOV, which is defined as $r_{FOV}$. Therefore, the each robot can only receive partial environmental information within its FOV. At time t, the robot i acquires a 4-channel local perception information $o_t^i = \{o_t^o, o_t^e, o_t^c, o_t^p\}$ with a size of $r_{FOV} \times r_{FOV}$, comprising an obstacle map, an explored map, a covered map, and a position map. The obstacle map $o_t^o$ collects free cells and obstacle cells. Similarly, the explored map $o_t^e$ and the covered map $o_t^e$ collect the positions of frontier cells and target cells respectively. The position map $o_t^p$ collects the position information of neighbor robots $N_i$; wherein, the neighbor robots $N_i$ refers to a set of robots that satisfy the communication condition ($\|p_{N_i} - p_i\| \leq r_{comm}$). If the relative distance between the neighbor robots $p_{N_i}$ and the robot $p_i$ is less than the communication distance $r_{comm}$. For example, a robot j is called a neighbor of a robot i if a robot located in $p_j$ that satisfies $\|p_j - p_i\| \leq r_{comm}$. In addition, before extracting the encoded information of the local perception information, the unexplored area is masked, that is, the environmental information under the unexplored area is set to be invisible to the robot. At the implementation level, a binarization function is used to set unexplored areas on all channel maps to 0.

In the higher-level decision-making process (i.e., the Actor$^R$ network), the robot has to execute two kinds of planning simultaneously. On one hand, the frontier cells or target cells should be identified based on local perception information $o_t^i$, so as to better perform exploration or coverage subtasks. On the other hand, the robot needs to use the joint perception information $jo_t^i$ to evaluate the expected reward between the exploration and coverage. Specifically, the calculation of expectation for optimizing the objective function $J(\theta_r)$ is as follows:

$$J(\theta_r) = \widehat{\mathbb{E}}_t [\nabla_{\theta_r} \log \pi_{\theta_r}^i(\rho_t^i | o_t^i, jo_t^i) \hat{A}_t^i],$$

where, $\pi_{\theta_r}^i$ represents the parametric representation of the role policy, $\hat{A}_t^i$ is an evaluation of advantage function of the role policy.

The joint perception information $jo_t^i = \{jo_t^{me}, jo_t^{mc}\}$, comprising the merged explored map $jo_t^{me}$ and the merged covered map $jo_t^{mc}$. Wherein, the merged explored map $jo_t^{me} \in \mathbb{R}^{H \times W}$, $jo_t^{me} = \{o_0^c, \ldots, o_{t-1}^c, o_t^c\}$ refers to a set of historically explored areas of all the robots, wherein W and H refers to the width and height of the simulation environment. The merged covered map $jo_t^{mc} \in \mathbb{R}^{H \times W}$, $jo_t^{mc} = \{o_0^c, \ldots, o_{t-1}^c, o_t^c\}$ refers to a set of historical covered areas of all the robots. Therefore, the local perception information and the joint perception information are used as inputs of the Actor$^R$ network, which outputs a role action probability distribution for the robot.

During the training phase of the role policy, two different distinct rewards are defined for each robot: the exploration reward $R_e$ and the coverage reward $R_c$ (see Section B3 for the specific settings of these two rewards). Therefore, the reward of the role policy is $R_r = \alpha R_e + \beta R_c$, where, $\alpha$ and $\beta$ are the reward weight coefficients of explore role action and cover role action respectively, and its setting purpose is to modulate the execution ratio of subtasks in combination with the completion degree of tasks. When $\alpha$ is set to 1, $\beta$ is 0, it means that the robot has priority to perform the exploration subtask, otherwise, the robot needs to perform the coverage subtask.

The above settings for training role policy (or the Actor$^R$ network) train a distributed and independent role policy for each robot, which is also the core design of role selection. The present invention uses a multi-agent reinforcement learning algorithm to train role policy and centralized training distributed execution architecture based on an Actor-Critic structure. In the centralized training phase, the Critic$^R$ network calculates the state value $V_r(s)$, and obtains the advantage function $A_r(s, \rho)$ to judge the rationality of the role action calculated by the Actor$^R$ network.

Wherein, $$\hat{A}_r = \delta_t + (\gamma\lambda)\delta_{t+1} + \ldots + (\gamma\lambda)^{T-t+1}\delta_{T-1},$$

where, $\hat{A}_r$ represents the optimal evaluation value of A output by the model, and $\delta_t = r_t + \gamma V(s_{t+1}) - V(s_t)$; wherein, $r_t$ is the environmental reward at the time t, $V(s_t)$ and $V(s_{t+1})$ represent the state value functions at the time t and the time t+1, respectively, and $\gamma$ is the discount factor.

After taking the role action ρ in a state map S, if the value of A is greater than 0, it means that the role action ρ is greater than the average, which is a reasonable choice; if the value of A is less than 0, the role action ρ is worse than the average, which means it is not a good choice.

(3) Inputting the local perception information $o_t^i$ and the output role action $\rho_t^i$ into a primitive policy, and outputting a primitive action $a_t$ of robot to interact with the environment.

Specifically, the present example uses a two-dimensional grid map to model the multi-robot area search environment, and the primitive action space contains five discrete values: {forward, rightward, backward, leftward, stop}. These primitive actions are encoded as one-hot vectors and are determined based on the probability distribution output by the primitive policy $Actor^P$ or $\pi_{\theta_p}$.

At the time t, the robot i acquires a 4-channel local perception information $o_t^i = \{o_t^o, o_t^e, o_t^c, o_t^p\}$ with the size of $r_{FOV} \times r_{FOV}$, comprising the obstacle map, the explored map, the covered map, and the position map. Then the information is encoded by an encoder $(o_t^i): O \to \mathbb{R}^F$. In the present invention, a convolutional neural network (CNN) is adopted as the encoder to generate an embedding vector $z_t^i$. This encoder is shared among all the robots. The output role action $\rho_t^i$ of the role policy is concatenated with the embedding vector $z_t^i$ of local perception information to form the primitive observation with dimensions of F+1.

B3: Reward settings for the primitive policy. In the training phase of the primitive policy, two different rewards are set in combination with the subtasks, which are an exploration reward $R_e$ and a coverage reward $R_c$. A base reward $R_p$ (t) for each time t, is:

$$R_p(t) = \begin{cases} R_e, R_e = \sum_{i \in N} \frac{\sum_{k \in \overline{E_t}} u_t^k \mathbb{1}_{q_t^i = p^k}}{B_e}, & \rho_t^i = 0 \\ R_c, R_c = \sum_{i \in N} \sum_{j \in C_t} c_t^j \mathbb{1}_{q_t^i = p^j}, & \rho_t^i = 1 \end{cases}$$

where, $\rho_t^i$ is the output role action, the binarization $u_t^k$ indicates whether the robot i (i∈N, which means N robots in total) moves to an unexplored cell $\overline{E_t}$ at the time t, wherein $u_t^k = 1$, if k∈$\overline{E_t}$; otherwise, $u_t^k = 0$, indicates that the robot i does not move to the passable area at the time t. Similarly, the binarization $c_t^j$ indicates whether a position of the robot i at time t is the target cell, wherein $c_t^j = 1$ indicates that the robot position $q_t^i$ is located at the position $p^j$ of the target grid cell j, the target grid cell j is the existing target set $C_t$ in the environment; otherwise, $c_t^j = 0$, indicates that the position of the robot i at the time t is not the target cell.

When the role action $\rho_t^i$ output from the upper layer is equal to 0, the corresponding action reward is the exploration reward $R_e$, otherwise it is the coverage reward $R_c$. In a fully cooperative multi-robot setup, robots with the same role should share the same global reward. A role reward at the time t is the sum of all local rewards under the same role. When the robot visits a target cell $p^j$, $(q_t^i = p^j)$, it receives a coverage reward of 1. The exploration radius of each the robot is set to $rad_e$, which allows the robot to explore $2\pi \cdot rad_e$ cells in the discrete grid map. Accumulate all unexplored cells k at the time t as an exploration reward, where $u_t^k$ refers to that the robot moves to a passable area (satisfying $q_t^i = p^k$). In addition, dividing by exploration ability $B_e$ ensures that exploration reward regularizes to between (0, 1), aligned with the coverage reward.

In the present example, various settings are set for training of the primitive policy (or the $Actor^P$ network). Through inputting the role action $\rho_t$ output by the upper role policy and the local perception information $o_t$, the primitive action $a_t$ is output to interact with the environment. The ability of the primitive policy represents the ability to explore or cover.

Example 2

In one or more embodiments, providing a system for adaptively role-selection in coordinated multi-robot search task, comprising:
an action space module, configured to a role action space as two discrete values: [explore, cover];
a role selection module, configured to acquire and input local perception information $o_t^i$ and joint perception information $jo_t^i$ into a role policy, and to output a role action $\rho_t^i$; wherein, the local perception information comprises an obstacle map, an explored map, a covered map, and a position map; and, the joint perception information comprises a merged explored map and a merged covered map; and
a primitive action output module, configured to input the local perception information $o_t^i$ and the output role action $\rho_t^i$ into a primitive policy, and output a primitive action $a_t$ of robot to interact with the environment; wherein,
when the output role action $\rho_t^i$ received by a robot is an explore role action, the robot moves towards a frontier cell closest to the robot in a FOV; and, when the output role action $\rho_t^i$ received by the robot is a cover role action, the robot moves towards a target cell closest to the robot in the FOV.

Example 3

In one or more embodiments, providing a terminal device, comprising a processor and a memory, wherein the processor is used for implementing instructions, and the memory is used for storing a plurality of the instructions; wherein when the instructions are loaded by the processor, executing a method for adaptively role-selection in coordinated multi-robot search task according to Embodiment 1. For the sake of brevity, they are not repeated herein.

It should be understood that in the present example, the processor may be a central processing unit (CPU), other general-purpose processors, digital signal processors (DSP), application specific integrated circuits (ASIC), ready-made programmable gate arrays (FPGA) or other programmable logic devices, discrete gates or transistor logic devices, discrete hardware components, etc. A general-purpose processor can be a microprocessor or any conventional processor.

The memory can include read-only memory and random access memory, and provide instructions and data to the processor. A portion of the memory can also include non-volatile random access memory. For example, memory can also store information about device types.

In the implementation process, each step of the above method can be completed through hardware integrated logic circuits or software instructions in the processor.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

The invention claimed is:

1. A method for adaptively role-selection in coordinated multi-robot search task, comprising:
  defining a role action space as two discrete values: [explore, cover];
  acquiring and inputting local perception information $o_t^i$ and joint perception information $jo_t^i$ into a role policy, and outputting a role action $\rho_t^i$; wherein, the local perception information comprises an obstacle map, an explored map, a covered map, and a position map; and, the joint perception information comprises a merged explored map and a merged covered map; and
  inputting the local perception information $o_t^i$ and the output role action $\rho_t^i$ into a primitive policy, and outputting a primitive action $a_t$ of robot to interact with the environment; wherein, a training of the role policy, comprising:
  identifying, by the robot, frontier cells or target cells based on the local perception information $o_t^i$, and evaluating an expected reward between the exploration and the coverage by using the joint perception information $jo_t^i$; wherein, a specific calculation of the expected reward is as follows:

$$\widehat{\mathbb{E}}_t[\nabla_{\theta_r} \log \pi_{\theta_r}^i(\rho_t^i|o_t^i,jo_t^i)\hat{A}_t^i],$$

where, $\pi_{\theta_r}^i$ represents the parametric representation of the role policy, $\hat{A}_t^i$ is the advantage function of the role policy;
  defining an exploration reward $R_e$ and a coverage reward $R_c$ for each the robot, a reward function of the role policy is $R_r = \alpha R_e + \beta R_c$; where, $\alpha$ and $\beta$ are the reward weight coefficients of the explore role action and the cover role action, respectively;
  using, by the role policy, a centralized training distributed execution architecture based on an (Actor-Critic)$^R$ structure, and training the role policy by using a multi-agent reinforcement learning algorithm; wherein, in a centralized training phase, outputting the role action by an Actor$^R$ network, and calculating a state value function $V_r(s)$ by a Critic$^R$ network to obtain the advantage function $A_r(s, \rho)$ to judge a rationality of the role action calculated by the Actor$^R$ network;
  wherein, the advantage function $A_r(s, \rho)$ specifically is:

$$\hat{A}_r = \delta_t + (\gamma\lambda)\delta_{t+1} + \ldots + (\gamma\lambda)^{T-t+1}\delta_{T-1},$$

where, $\delta_t = r_t + \gamma V(s_{t+1}) - V(s_t)$, $r_t$ is the environmental reward at the time t, $V(s_t)$ and $V(s_{t+1})$ represent the state value functions at the time t and the time t+1, respectively, $\gamma$ is the discount factor;
  after taking the role action $\rho$ in state S, if the value of A is greater than 0, representing that the role action $\rho$ is greater than an average, which is defined as a reasonable choice; if the value of A is less than 0, representing that the role action p is worse than the average, which is defined as a not-good choice; and
  in a training phase of the primitive policy, setting two different rewards: the exploration reward $R_e$ and the coverage reward $R_c$; obtaining a base reward $R_p$ (t) of the primitive policy for each time t is:

$$R_p(t) = \begin{cases} R_e, R_e = \sum_{i \in N} \frac{\sum_{k \in E_t^i} u_t^k \mathbb{1}_{q_t^i = p^k}}{B_e}, & \rho_t^i = 0 \\ R_c, R_c = \sum_{i \in N} \sum_{j \in C_t} c_t^j \mathbb{1}_{q_t^i = p^j}, & \rho_t^i = 1 \end{cases},$$

where, $\rho_t^i$ is the output role action, the binarization $u_t^k$ indicates whether a robot i moves to a passable area at the time t, and the passable area is an unexplored grid cell, $i \in N$, N is a number of robots; wherein, $u_t^k = 1$ indicates that a robot position $q_t^i$ is located at a position $p^k$ of a grid cell k, and the grid cell k is the passable area $E_t^i$; otherwise, $u_t^k = 0$, indicates that the robot i does not move to the passable area at the time t; the binarization $c_t^j$ indicates whether the robot i moves to a target cell at the time t, wherein $c_t^j = 1$ indicates that the robot position $q_t^i$ is located at a position $p^j$ of a target grid cell j, the target grid cell j is an existing target set $C_t$ in environment; otherwise, $c_t^j = 0$, indicates that the robot i does not move to the target cell at the time t.

2. The method according to claim 1, wherein when the robot receives an explore role action, expecting that the robot moves towards a frontier cell closest to the robot in a field of view;
  and, when the robot receives a cover role action, expecting that the robot moves towards a target cell closest to the robot in the field of view.

3. The method according to claim 1, wherein using a convolutional neural network (CNN) as a encoder to generate an embedding vector by embedding the local perception information; the embedding vector is shared among all the robots; splicing the output role action with the embedding vector of the local perception information as an input of the primitive policy;
  before extracting the encoded information of the local perception information, masking an unexplored area.

4. A system for adaptively role-selection in coordinated multi-robot search task, comprising:
  an action space module, configured to define a role action space as two discrete values: [explore, cover];
  a role selection module, configured to acquire and input local perception information $o_t^i$ and joint perception information $jo_t^i$ into a role policy, and outputting a role action $\rho_t^i$; wherein, the local perception information comprises an obstacle map, an explored map, a covered map, and a position map; and, the joint perception information comprises a merged explored map and a merged covered map; and
  a primitive action output module, configured to input the local perception information $o_t^i$ and the output role action $\rho_t^i$ into a primitive policy, and outputting a primitive action $a_t$ of robot to interact with the environment; wherein,
  a training of the role policy, comprising:
  identifying, by the robot, frontier cells or target cells based on the local perception information $o_t^i$, and evaluating an expected reward between the exploration and the coverage by using the joint perception information $jo_t^i$; wherein, a specific calculation of the expected reward is as follows:

$$\widehat{\mathbb{E}}_t[\nabla_{\theta_r} \log \pi_{\theta_r}^i(\rho_t^i|o_t^i,jo_t^i)\hat{A}_t^i],$$

where, $\pi_{\theta_r}^i$ represents the parametric representation of the role policy, $\hat{A}_t^i$ is the advantage function of the role policy;

defining an exploration reward $R_e$ and a coverage reward $R_c$ for each the robot, a reward function of the role policy is $R_r = \alpha R_e + \beta R_c$; where, $\alpha$ and $\beta$ are the reward weight coefficients of the explore role action and the cover role action, respectively;

using, by the role policy, a centralized training distributed execution architecture based on an (Actor-Critic)$^R$ structure, and training the role policy by using a multi-agent reinforcement learning algorithm; wherein, in a centralized training phase, outputting the role action by an Actor$^R$ network, and calculating a state value function $V_r(s)$ by a Critic$^R$ network to obtain the advantage function $A_r(s, \rho)$ to judge a rationality of the role action calculated by the Actor$^R$ network;

wherein, the advantage function $A_r(s, \rho)$ specifically is:

$$\hat{A}_r = \delta_t + (\gamma\lambda)\delta_{t+1} + \ldots + (\gamma\lambda)^{T-t+1}\delta_{T-1},$$

where, $\delta_t = r_t + \gamma V(s_{t+1}) - V(s_t)$, $r_t$ is the environmental reward at the time t, $V(s_t)$ and $V(s_{t+1})$ represent the state value functions at the time t and the time t+1, respectively, $\gamma$ is the discount factor;

after taking the role action $\rho$ in state S, if the value of A is greater than 0, representing that the role action $\rho$ is greater than an average, which is defined as a reasonable choice; if the value of A is less than 0, representing that the role action $\rho$ is worse than the average, which is defined as a not-good choice; and in a training phase of the primitive policy, setting two different rewards: the exploration reward $R_e$ and the coverage reward $R_c$; obtaining a base reward $R_p(t)$ of the primitive policy for each time t is:

$$R_p(t) = \begin{cases} R_e, R_e = \sum_{i \in N} \frac{\sum_{k \in \overline{E_t}} u_t^k \mathbb{1}_{q_t^i = p^k}}{B_e}, & \rho_t^i = 0 \\ R_c, R_c = \sum_{i \in N} \sum_{j \in C_t} c_t^j \mathbb{1}_{q_t^i = p^j}, & \rho_t^i = 1 \end{cases},$$

where, $\rho_t^i$ is the output role action, the binarization $u_t^k$ indicates whether a robot i moves to a passable area at the time t, and the passable area is an unexplored grid cell, $i \in N$, N is a number of robots; wherein, $u_t^k = 1$ indicates that a robot position $q_t^i$ is located at a position $p^k$ of a grid cell k, and the grid cell k is the passable area $\overline{E_t}$; otherwise, $u_t^k = 0$, indicates that the robot i does not move to the passable area at the time t; the binarization $c_t^j$ indicates whether the robot i moves to a target cell at the time t, wherein $c_t^j = 1$ indicates that the robot position $q_t^i$ is located at a position $p^j$ of a target grid cell j, the target grid cell j is an existing target set $C_t$ in environment; otherwise, $c_t^j = 0$, indicates that the robot i does not move to the target cell at the time t.

5. A terminal device, comprising a processor and a memory, wherein the processor is used for implementing instructions, and the memory is used for storing the instructions; wherein when the instructions are loaded by the processor, executing a method for adaptively role-selection in coordinated multi-robot search task according to claim 1.

* * * * *